United States Patent
Fukumoto et al.

(10) Patent No.: US 6,560,965 B1
(45) Date of Patent: May 13, 2003

(54) SYSTEM AND METHOD OF CLEANING A RECUPERATOR IN A MICROTURBINE POWER SYSTEM

(75) Inventors: Paul M. Fukumoto, Westminster, CA (US); Peter Zheng, Rancho Palos Verdes, CA (US); Daniel W. Burnes, San Diego, CA (US)

(73) Assignee: Honeywell Power Systems Inc., Albuquerque, NM (US)

( * ) Notice: Subject to any disclaimer, the term of this patent is extended or adjusted under 35 U.S.C. 154(b) by 61 days.

(21) Appl. No.: 09/933,656

(22) Filed: Aug. 20, 2001

(51) Int. Cl.[7] ............ F02C 1/00; F02C 7/00; F23L 15/02
(52) U.S. Cl. ............ 60/772; 60/39.511; 134/19; 134/39; 165/5; 165/95
(58) Field of Search ............ 60/772, 39.511, 60/39.512; 134/19, 20, 39; 165/5, 95

(56) References Cited

U.S. PATENT DOCUMENTS

| | | |
|---|---|---|
| 417,019 A | 12/1889 | Gordon |
| 4,027,145 A | 5/1977 | McDonald et al. |
| 4,047,972 A | 9/1977 | Stumbar et al. |
| 4,115,998 A | 9/1978 | Gilbert et al. |
| 4,259,835 A | 4/1981 | Reed et al. |
| 4,283,634 A | 8/1981 | Yannone et al. |
| 4,381,814 A | 5/1983 | Funk |
| 4,568,198 A | 2/1986 | Szabo |
| 4,869,209 A | 9/1989 | Young |
| 5,119,630 A | 6/1992 | Matijas |
| 5,305,230 A | 4/1994 | Matsumoto et al. |
| 5,447,059 A | 9/1995 | Miller et al. |
| 5,794,446 A | 8/1998 | Earley et al. |
| 5,855,112 A | 1/1999 | Bannai et al. |
| 6,032,456 A * | 3/2000 | Easom et al. ........ 60/793 |
| 6,138,081 A | 10/2000 | Olejack et al. |
| 6,155,038 A | 12/2000 | Irwin et al. |
| 6,313,544 B1 * | 11/2001 | Mongia et al. ........ 290/52 |

FOREIGN PATENT DOCUMENTS

WO      WO97/09524      3/1997

* cited by examiner

Primary Examiner—Charles G. Freay
(74) Attorney, Agent, or Firm—William J. Zak, Jr. Esq.

(57) ABSTRACT

A microturbine power system and of a method of operating same comprising automatically detecting fouling of a recuperator and then cleaning the recuperator.

20 Claims, 4 Drawing Sheets

SYSTEM AND METHOD OF CLEANING A RECUPERATOR IN A MICROTURBINE POWER SYSTEM

BACKGROUND OF THE INVENTION

1. Field of the Invention (Technical Field)

The present invention relates to methods and systems for cleaning fouled recuperators in microturbine power systems.

2. Background

Microturbines are high speed, single or dual shaft, low compression turbine-driven generators of electricity and/or other power, and producing up to about 500 kW. They are multi-fuel, modular distributed power generation units having multiple applications. They offer the capability to produce electricity at a lower cost per kilowatt than do central plants, and they do not require the installation of expensive infrastructure to deliver power to the end users. Thus, in parts of the world lacking the transmission and distribution lines of a basic electric infrastructure, commercialization of microturbines may be greatly expedited. In the United States and other countries already having a suitable electric infrastructure, distributed generation units will allow consumers of electricity to choose the most cost-effective method of electric service. In addition to primary power generation, microturbines also offer an efficient way to supply back-up power, uninterruptible power, peak-shaving, and combined heat (or chilling) and power through the use of cogeneration equipment. Other applications for microturbines exist as well.

In a typical microturbine system, compressed air is directed to a recuperator in which the temperature of the compressed air is increased using waste heat from the turbine exhaust gas. After being heated in the recuperator, the compressed air is directed to a combustor in which additional heat is added to further raise the temperature of the compressed air.

The recuperator in microturbine power systems frequently foul during operation. Fouling is the deposition of the unburnt hydrocarbons on the recuperator heat transfer surface, typically on the cooler portion of the exhaust gas side of the recuperator heat transfer surface downstream of the combustor. When the latter portion of the recuperator is subject to such carbon deposits, the recuperator effectiveness decreases significantly, which in turn decreases the overall microturbine system efficiency and increases fuel usage.

Existing methods for preventing and/or resolving fouling include the following:

U.S. Pat. No. 4,047,972, entitled Method for Thermally De-Sooting Heat Transfer Surfaces, to Stumbar et al., issued Sep. 13, 1977, discloses utilizing a CO monitor to control thermal de-sooting of a heat exchanger in order to prevent run-away reactions. This patent does not teach or disclose a recuperator disposed so as to pre-heat fuel utilizing exhaust gases. The patent does disclose (col. 3, lines 35–63) feeding nitrogen or another inert gas into the heat exchanger tubes (to prevent corrosion) and increasing the temperature of the exhaust gases from the gas turbine through the heat exchanger until the CO level, as measured by a continuous monitoring device, is within acceptable levels. This thus oxidizes and removes carbonaceous deposits within the heat exchanger. The patent does not teach use of temperature differential of heat exchange to determine when fouling exceeds acceptable limits.

U.S. Pat. No. 4,115,998, entitled Combustion Monitor, to Gilbert et al., issued Sep. 26, 1978, discloses a combustion monitoring system with a plurality of sensors. The gas turbine disclosed incorporates a compressor, combustor and turbine, but does not include a recuperator. The sensors include temperature sensors for ascertaining "failure modes", but the patent does not disclose using temperature sensors for ascertaining fouling or deposition of unburnt hydrocarbons.

U.S. Pat. No. 4,869,209, entitled Soot Chaser, to Young, issued Sept. 26, 1989, discloses an automatic programmable cleaning system for heat transfer tubes in an engine exhaust gas waste heat recovery boiler. This patent is not directed to turbine systems as such, but is rather directed to engine exhaust gas waste heat recovery boilers. The cleaning method involves release of water utilizing an automatic programmable cleaning system, which water vaporizes and exhausts carbon through the waste heat exhaust gas stream. No recuperator is disclosed, and no temperature sensors are disclosed.

U.S. Pat. No. 5,794,446, entitled Power Plant Performance Management Systems and Methods, to Earley et al, issued Aug. 18, 1998, discloses a temperature-based system for use in monitoring a steam powered electric power generating system. This system employs a multi-turbine generator system, with a boiler, superheater and reheater, but not a recuperator. The temperature detectors are utilized to determine the presence of condensate or feed water in the system, thereby optimizing performance. The temperature detectors and computer compare first temperatures with second temperatures, and can evaluate the temperatures in relation to one another, and compares the difference to a standard temperature difference.

While the general principal of heating a device through which a carbon-based fuel passes to a "self-cleaning" temperature, to combust unburnt hydrocarbons, is known, the present invention provides three novel means for generating the proper temperatures: (1) blocking the exhaust to reduce heat loss and thereby increase heat transfer to the recuperator; (2) inducing an air flow with an air pump to convection heat the recuperator core from the residual heat in the combustor, engine core and hot parts of the recuperator; and (3) use of an electric heat probe or gas torch inserted into the recuperator inlet plenum.

Furthermore, in contrast with known systems and methods, the invention monitors the difference between the recuperator hot gas in and recuperator air out to determine fouling; when this difference is determined to be above a specified limit, then the recuperator is fouled. This control mechanism is then utilized to activate one or a combination of the disclosed "self-cleaning" mechanisms.

While various temperature analysis systems are known in the art, there is no disclosure of a temperature analysis system measuring the difference between turbine exhaust gas temperature in and air temperature out to determine fouling. Further, there is no disclosure of a system utilizing this or any analogous control parameter to initiate a "self-cleaning" mechanism, including, for example, the disclosed "self-cleaning" mechanisms.

SUMMARY OF THE INVENTION
(DISCLOSURE OF THE INVENTION)

The present invention is of a microturbine power system and of a method of operating same comprising automatically detecting fouling of a recuperator and automatically cleaning the recuperator. In the preferred embodiment, detecting comprises determining a temperature difference between air exiting from the recuperator and gas entering the recuperator, preferably via a recuperator gas inlet temperature sensor and a recuperator air outlet temperature sensor, and preferably employing an engine control unit receiving input from the sensors. Cleaning preferably comprises initiating cleaning via an engine control unit when fouling is detected. Cleaning can employ a recuperator gas exhaust block, gas heating (preferably proximate a recuperator inlet plenum and employing an electric heat probe or a gas torch), and/or an air pump to convection heat a core of the recuperator.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION

Figure 1:
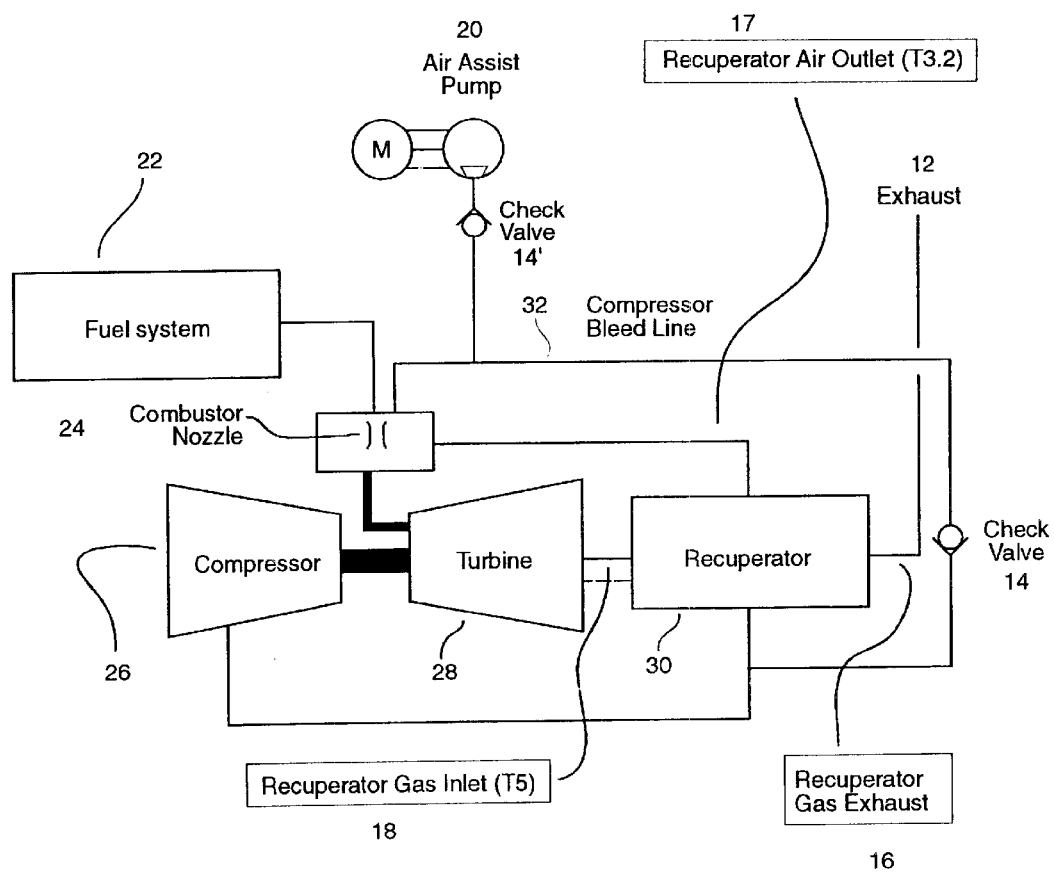
FIG. 1 is a block diagram of a typical microturbine power system.

The present invention provides a method, system, and software for cleaning a fouled recuperator of a microturbine power system. Referring to FIG. 1, such a system 10 typically comprises compressor 26, turbine 28, recuperator 30, recuperator air outlet 17, recuperator gas inlet 18, recuperator gas exhaust 16, fuel system 22, combustor nozzle 24, air assist pump 20, check valves 14,14', compressor bleed line 32, and exhaust 12. Fouling results from deposition of unburnt hydrocarbons, resulting in carbon deposits on the cooler end of recuperator heat transfer surfaces.

Figure 3:
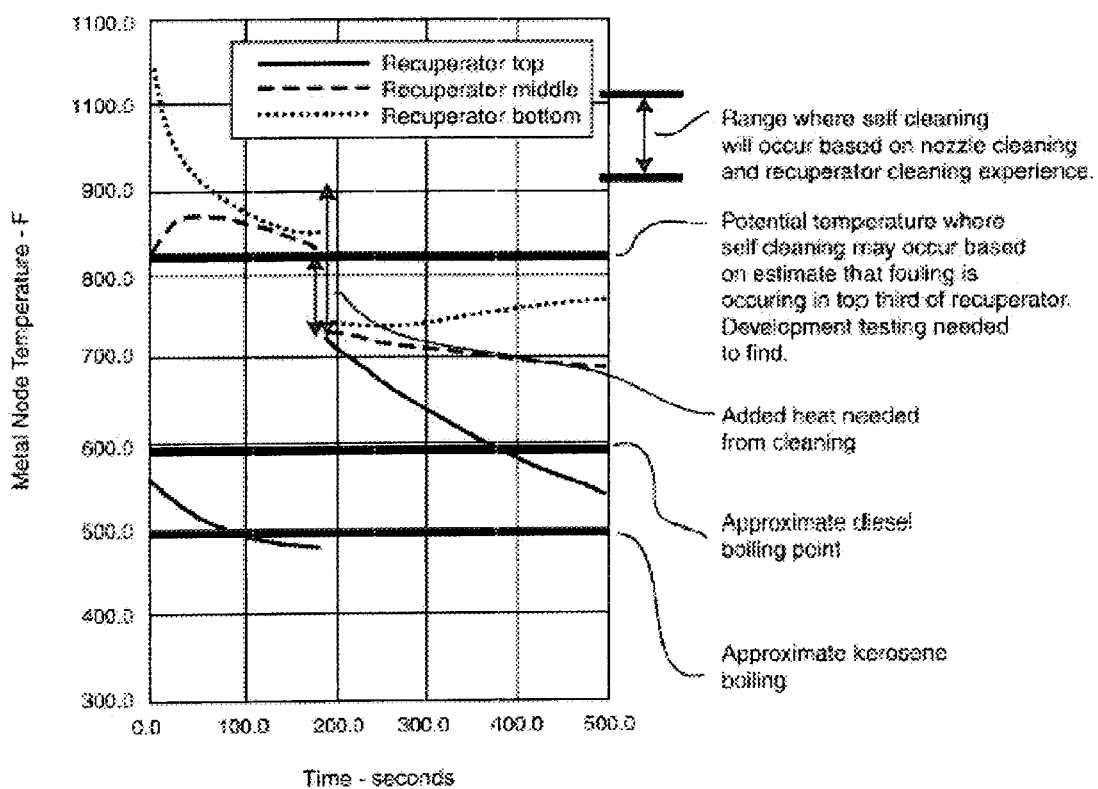
FIG. 3 is a time/temperature graph illustrating the principles of the invention.

The invention utilizes residual heat from the engine at shutdown to clean the recuperator. Referring to FIG. 3, the gas path cleans itself at between approximately 800° to 1000° F. (preferably between approximately 800° to 900° F.). During an engine shutdown, the temperature profile through the recuperator is approximately 1200° F. in and 500° F. out. The residual heat equalizes in the system on shutdown so that the recuperator core is at approximately 700° F.

Raising the temperature in the recuperator to the self-cleaning temperature (preferably 800° to 900° F.) is accomplished in the invention by one or more of the following: (1) blocking the exhaust to reduce heat loss and thereby increase heat transfer to the recuperator; (2) inducing an air flow with an air pump to convection heat the recuperator core from the residual heat in the combustor, engine core, and hot parts of the recuperator; and (3) use of an electric heat probe (electric tubular heater) or gas (propane) torch inserted into the recuperator inlet plenum) Blocking the exhaust is especially effective in an add-on system such as a cogenerator where the block exhaust is easily accessible. Use of an air pump is effective particularly in that the air pump already exists on the engine and can be run after shutdown to force the residual heat from the combustor, turbine, and recuperator out the exhaust, thus increasing the heating on the recuperator exhaust side.

Blocking the recuperator exhaust for cleaning can be accomplished with or without user intervention, depending on system design. The engine should first be run to steady state temperatures. A special engine shutdown is then performed which does not cool off the engine. This preferably is a quick engine stop that does not allow the hot metal parts to cool off. A normal engine shutdown idles at lower temperatures (500 degrees F. lower than normal) before actually turning the engine off. The engine exhaust is then blocked, preferably with a metal plate, preferably a sliding plate incorporated in the top panel/turret. The engine is then allowed to cool down completely. Running the system air pump during the cooldown aids in keeping the heat from the combustor and turbine transferring to the recuperator instead of soaking back naturally to the compressor. The compressor and generator section of the engine core is the coldest part of the machine. The soakback heat naturally wants to equalize by flowing to the cold end. The pump airflow helps create a thermal dam by trying to convect the heat to the hotter section. The important element to accomplish is that the engine needs to run normally without the blockage, be shutdown quickly and then be exhaust blocked.

Figure 2:
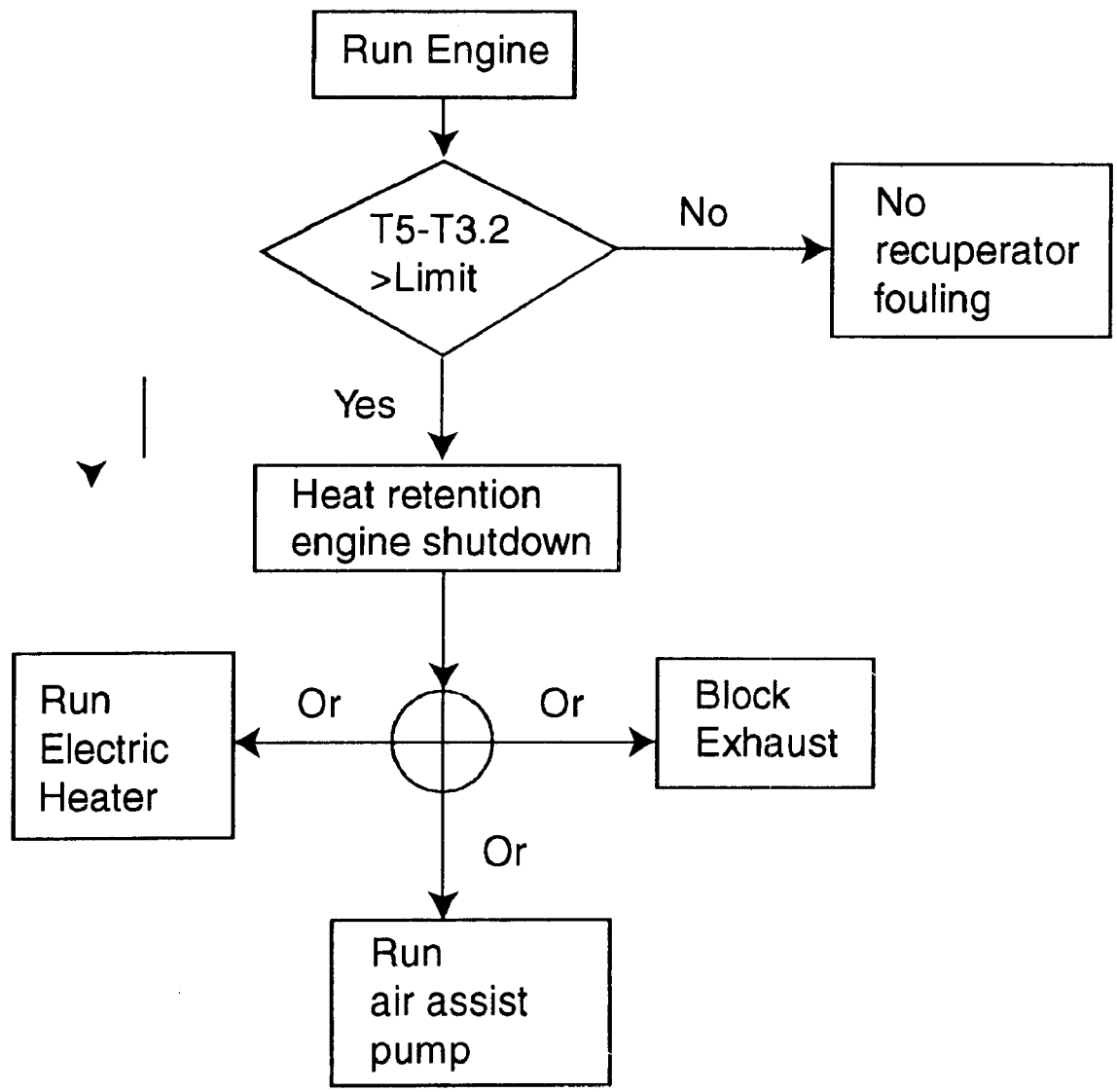
FIG. 2 is a flow diagram of the preferred method of the invention.

Referring to FIG. 2, engine control software of the invention can identify recuperator fouling by monitoring the difference between the recuperator hot gas in (labeled T5) and recuperator hot air side out (labeled T3.2). When this difference is above a specified limit (such as 100° F.), then the recuperator is fouled. At this time, the engine is run to full steady state temperature and then shutdown to retain the residual heat, whereupon the temperature is raised in the recuperator as set forth above.

Figure 4:
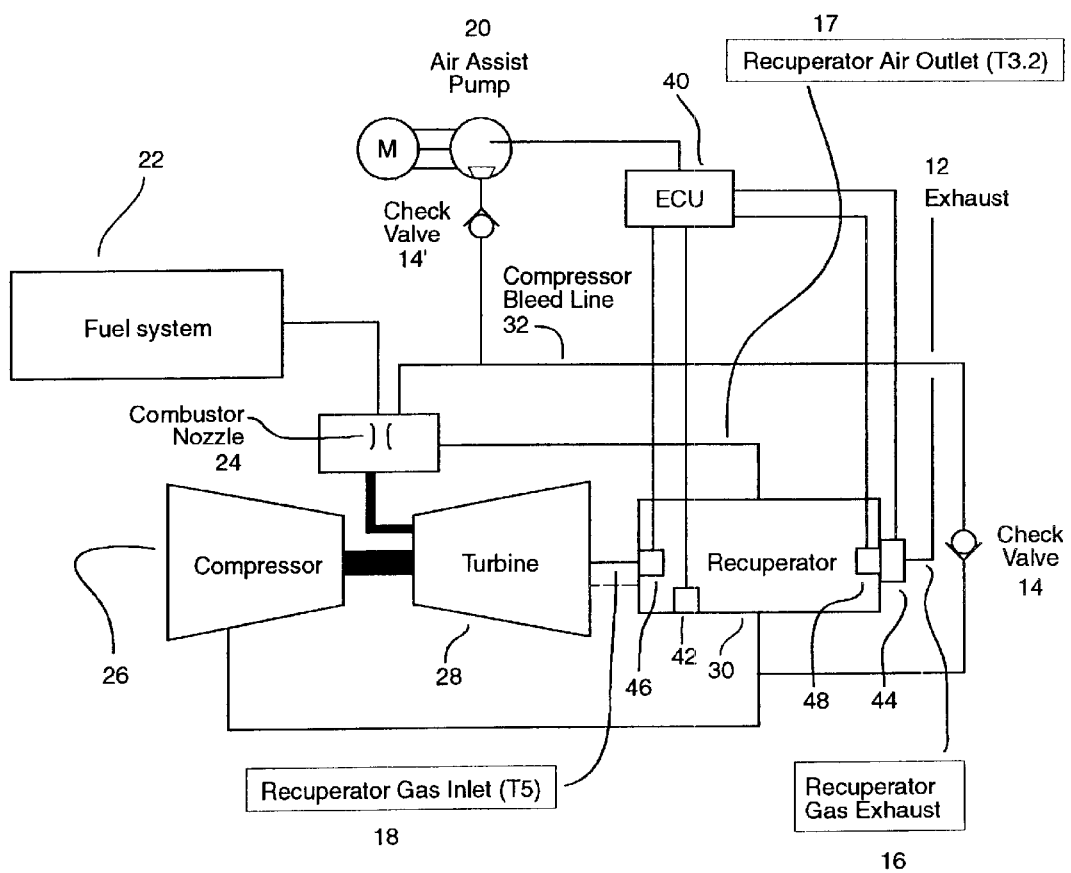
FIG. 4 is a block diagram of the system of the invention.

Referring to FIG. 4, the system of the invention 100 comprises an engine control unit (ECU) 40 on which the engine control software of the invention executes. Control lines from the ECU include those to the air assist pump, to optional heater 42, to optional exhaust block 44, to gas inlet temperature sensor 46, and to gas exhaust temperature sensor 48.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A microturbine power system comprising means for automatically detecting fouling of a recuperator and means for cleaning the recuperator.

2. The system of claim 1 wherein said detecting means comprises means for determining a temperature difference between turbine exhaust gas entering the recuperator and combustion air exiting the recuperator.

3. The system of claim 2 wherein said determining means comprises a recuperator gas inlet temperature sensor and a recuperator air outlet temperature sensor.

4. The system of claim 3 wherein said determining means additionally comprises an engine control unit receiving input from said sensors.

5. The system of claim 1 wherein said cleaning means comprises an engine control unit initiating cleaning when said detecting means detects fouling.

6. The system of claim 5 wherein said cleaning means additionally comprises a recuperator gas exhaust block.

7. The system of claim 5 wherein said cleaning means additionally comprises gas heating means.

8. The system of claim 7 wherein said gas heating means is proximate a recuperator inlet plenum.

9. The system of claim 7 wherein said gas heating means comprises a means selected from the group consisting of an electric heat probe and a gas torch.

10. The system of claim 5 wherein said cleaning means additionally comprises an air pump to convection heat a core of the recuperator.

11. A method of operating a microturbine power system, the method comprising the steps of automatically detecting fouling of a recuperator and cleaning the recuperator.

12. The method of claim 11 wherein the detecting step comprises the step of determining a temperature difference between turbine exhaust gas entering the recuperator and combustion air exiting the recuperator.

13. The method of claim 12 wherein the determining step comprises employing a recuperator gas inlet temperature sensor and a recuperator air outlet temperature sensor.

14. The method of claim 13 wherein the determining step additionally comprises employing an engine control unit receiving input from the sensors.

15. The method of claim 11 wherein the cleaning step comprises initiating cleaning via an engine control unit when the detecting step detects fouling.

16. The method of claim 15 wherein the cleaning step comprises employing a recuperator gas exhaust block.

17. The method of claim 15 wherein the cleaning step comprises gas heating.

18. The method of claim 17 wherein gas heating occurs proximate a recuperator inlet plenum.

19. The method of claim 17 wherein gas heating comprises employing a means selected from the group consisting of an electric heat probe and a gas torch.

20. The method of claim 15 wherein the cleaning step comprises employing an air pump to convection heat a core of the recuperator.

* * * * *